(12) United States Patent
Hirata (10) Patent No.: US 9,017,506 B2
(45) Date of Patent: Apr. 28, 2015

(54) METHOD FOR MANUFACTURING CORE OF ROTATING ELECTRICAL MACHINE

(75) Inventor: Kazuyuki Hirata, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 141 days.

(21) Appl. No.: 13/616,471

(22) Filed: Sep. 14, 2012

(65) Prior Publication Data

US 2013/0075029 A1 Mar. 28, 2013

(30) Foreign Application Priority Data

Sep. 22, 2011 (JP) ................................ 2011-207835

(51) Int. Cl.
*H02K 15/02* (2006.01)
*B21D 28/12* (2006.01)
(Continued)

(52) U.S. Cl.
CPC ......... *H02K 15/024* (2013.01); *Y10T 156/1062* (2015.01); *Y10T 156/1056* (2015.01); *Y10T 156/1092* (2015.01); *H02K 15/02* (2013.01); *Y10T 156/1074* (2015.01); *B32B 38/04* (2013.01); *B21D 28/12* (2013.01);
(Continued)

(58) Field of Classification Search
CPC ....... H02K 15/024; H02K 15/02; H02K 1/16; H02K 1/12; H02K 15/055; H02K 1/182; H02K 1/185; H02K 1/187; H02K 1/10; H02K 1/243; H02K 1/278; H02K 1/2786; B21D 28/06; B21D 28/02; B21D 28/12; B21D 35/007; B21D 43/02; B21D 43/003; B32B 38/105; B32B 38/04; Y10T 156/13; Y10T 156/1304; Y10T 156/1039; Y10T 156/1056; Y10T 156/107; Y10T 156/1074; Y10T 156/1077

USPC ............... 310/216.008, 216.009, 216.048, 310/216.065; 29/564, 596, 598; 156/263, 156/264, 265, 299
See application file for complete search history.

(56) References Cited

U.S. PATENT DOCUMENTS

| 4,272,579 A | 6/1981 | Mitsui |
| 6,899,783 B2 * | 5/2005 | Oguri et al. .................. 156/259 |
| 8,413,318 B2 | 4/2013 | Ikeda et al. |

(Continued)

FOREIGN PATENT DOCUMENTS

| CN | 102195417 | 9/2011 |
| JP | 2005-020972 | 1/2005 |

(Continued)

OTHER PUBLICATIONS

Japanese Office Action in JP 2011-207835, mailed Jan. 7, 2015, 3 pages.

(Continued)

*Primary Examiner* — Linda L Gray
(74) *Attorney, Agent, or Firm* — Greenblum & Bernstein, P.L.C.

(57) ABSTRACT

A core of a rotating electrical machine is formed by laminating core plates, which are each formed by a plurality of core pieces. According to the method for manufacturing the core, a belt-like workpiece is first conveyed intermittently in its longitudinal direction. Then, while the workpiece is in a stopped state, side edges of a core piece are punched out. At a downstream position in the conveying direction of the workpiece, the remaining edges of the core piece are cut, so that the core piece is punched out. The punched out core pieces are lined up on a support. The core plate is thus formed, and the core pieces are laminated.

6 Claims, 12 Drawing Sheets

(51) Int. Cl.
*B32B 38/04* (2006.01)
*H02K 1/16* (2006.01)

(52) U.S. Cl.
CPC .............. *Y10T156/1077* (2015.01); *H02K 1/16* (2013.01); *H02K 2201/09* (2013.01)

(56) References Cited

U.S. PATENT DOCUMENTS

2011/0225805 A1   9/2011   Ikeda et al.
2011/0232076 A1*  9/2011   Matsubara et al. ............. 29/564

FOREIGN PATENT DOCUMENTS

| JP | 2006-223022 | 8/2006 |
| JP | 2007-028799 | 2/2007 |
| JP | 2009-038915 | 2/2009 |
| JP | 2010-213505 | 9/2010 |
| JP | 2011-61958  | 3/2011 |

OTHER PUBLICATIONS

Chinese Office Action in CN 201210348266.6, with English language translation, dated Dec. 12, 2014, 13 pages.

* cited by examiner

12
METHOD FOR MANUFACTURING CORE OF ROTATING ELECTRICAL MACHINE

BACKGROUND OF THE INVENTION

The present invention relates to a method for manufacturing a stator core and a rotor core of an electrical rotating machine such as a motor.

For example, Japanese Laid-Open Patent Publication No. 2006-223022 discloses a method for manufacturing such an electrical rotating machine. According to the method disclosed in the document, a workpiece, which is a belt-like steel plate, is conveyed intermittently in its longitudinal direction. While the workpiece is in the stopped state, core pieces are punched out of the workpiece. Next, a push-back operation is performed in which the punched out core pieces are pushed back into the punching hole. When the workpiece is conveyed to the next processing step, the core pieces are pushed out of the workpiece, and lined up on a table. Core plates are thus formed and laminated to form a core.

In the above described manufacturing method, core pieces are pushed back into the punching holes. This is likely to form deficiencies such as burrs at the outer periphery of the core pieces. Accordingly, a polishing process needs to be performed to remove burrs. If burrs or scratches are left unattended, the magnetic property will deteriorate, which can lower the performance of the core. To deal with such problems, a core plate may be formed at a position where core pieces are punched out, without performing the push-back operation after core pieces are punched out. However, to punch core pieces at a position where a core plate is formed, an annular die that has a shape corresponding to the entirety of the core pieces is required. When an annular die is employed, a space having a dimension corresponding to the thickness of the die is needed on either side of a punched out core piece. It is therefore impossible to line up core pieces without spaces in between, and core plates cannot be produced.

SUMMARY OF THE INVENTION

Accordingly, it is an objective of the present invention to provide a method for manufacturing a core of an electrical rotating machine that solves the above described problems.

To achieve the foregoing objective and in accordance with one aspect of the present invention, a method for manufacturing a core of a rotating electrical machine is provided. The core is formed by laminating core plates made of a plurality of core pieces. The method includes: intermittently conveying a belt-like workpiece along the length of the workpiece; punching out side edges of the core piece while the workpiece is in a stopped state and, at a downstream position in the conveying direction of the workpiece, cutting the remaining edges of the core piece to punch out the core piece; and laminating the core pieces while lining up the punched out core pieces to form a core plate.

DETAILED DESCRIPTION OF THE PREFERRED EMBODIMENTS

First Embodiment

A method for manufacturing a stator core of a motor according to a first embodiment of the present invention will now be described with reference to FIGS. 1 to 11.

Figure 1:
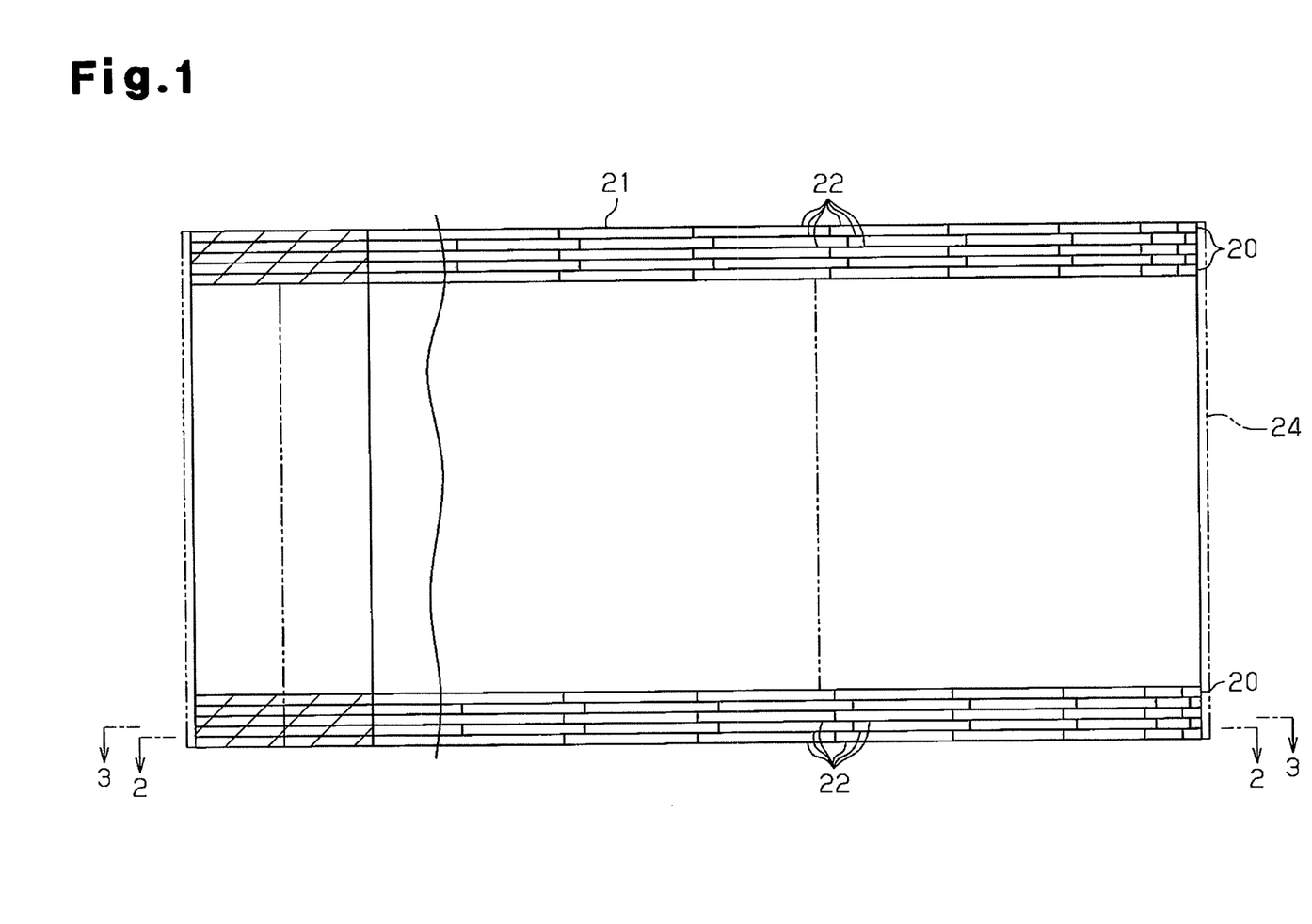
FIG. 1 is a partial side view illustrating a stator core that has been manufactured by a manufacturing method according to a first embodiment of the present invention.
Figure 2:
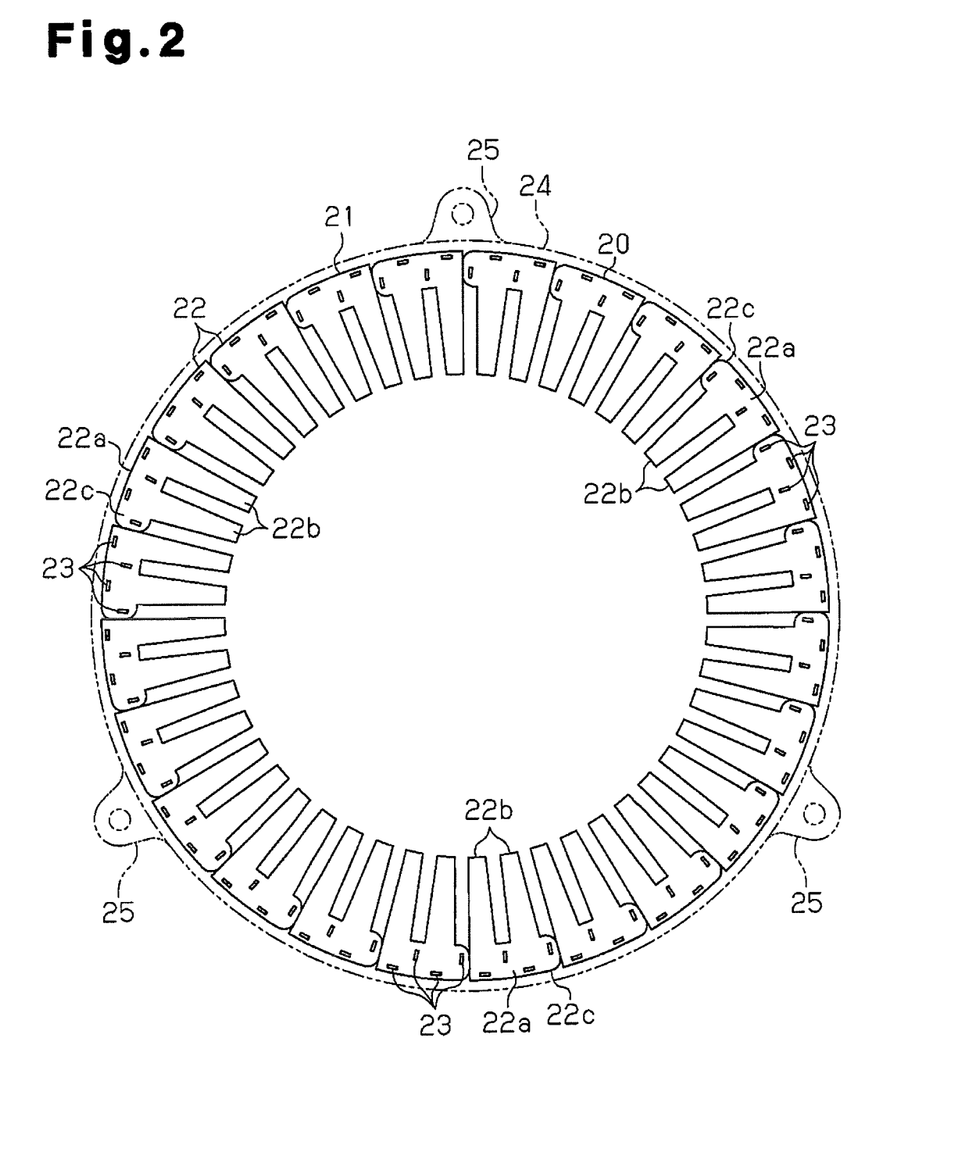
FIG. 2 is an end view taken along line 2-2 of FIG. 1.
Figure 3:
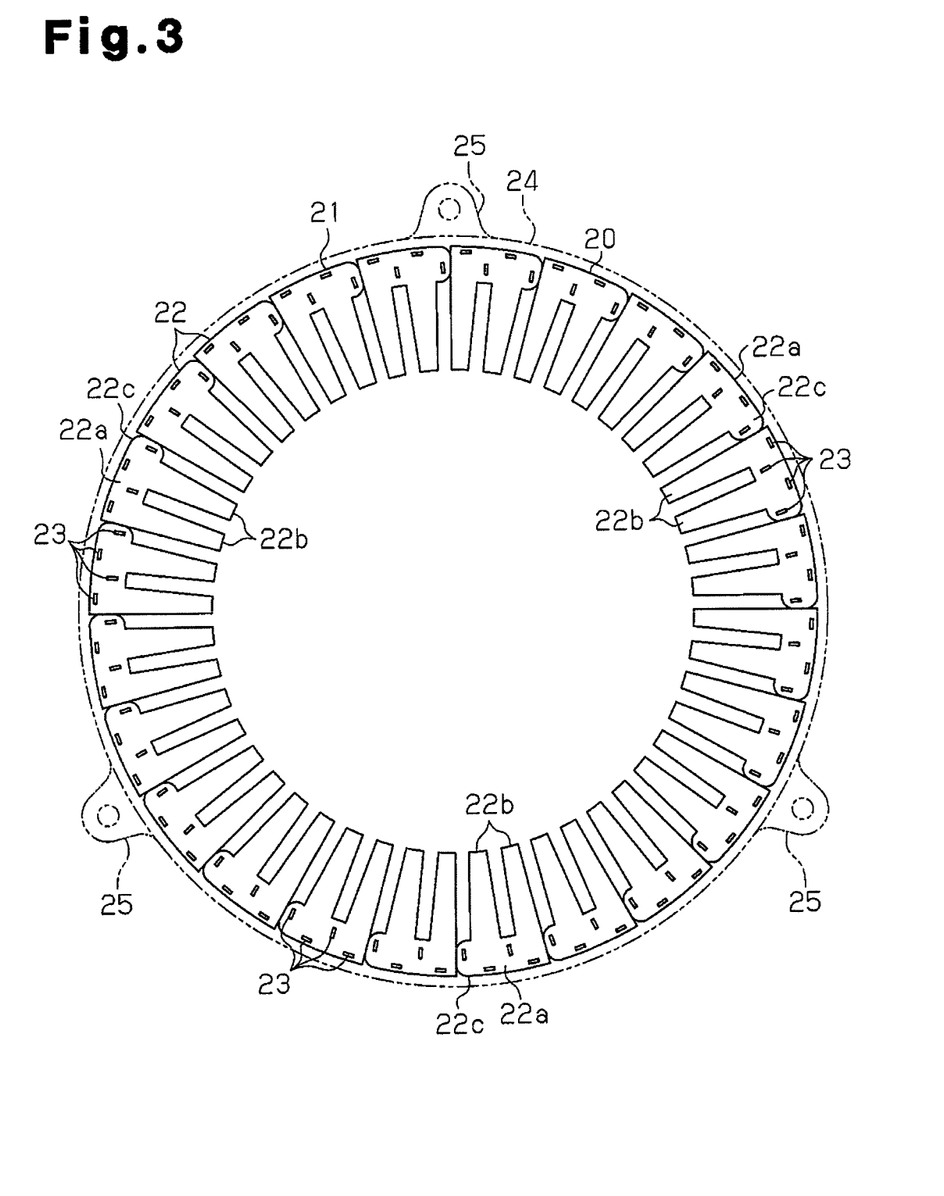
FIG. 3 is an end view taken along line 3-3 of FIG. 1.

As shown in FIGS. 1 to 3, a stator core 21 is formed by laminating core plates 20, each of which is formed by annularly arranging core pieces 22. As shown in FIGS. 2 and 3, the core pieces 22 in each layer are arranged in the opposite orientation to the core pieces 22 in the core plate 20 in the adjacent layer. Each core piece 22 includes an arcuately extending yoke portion 22a and two tooth portions 22b. The tooth portions 22b are formed on the inner edge of the yoke portions 22a and each extends in the radial direction. The yoke portion 22a has a projection 22c for coupling on one of the sides.

Figure 5:
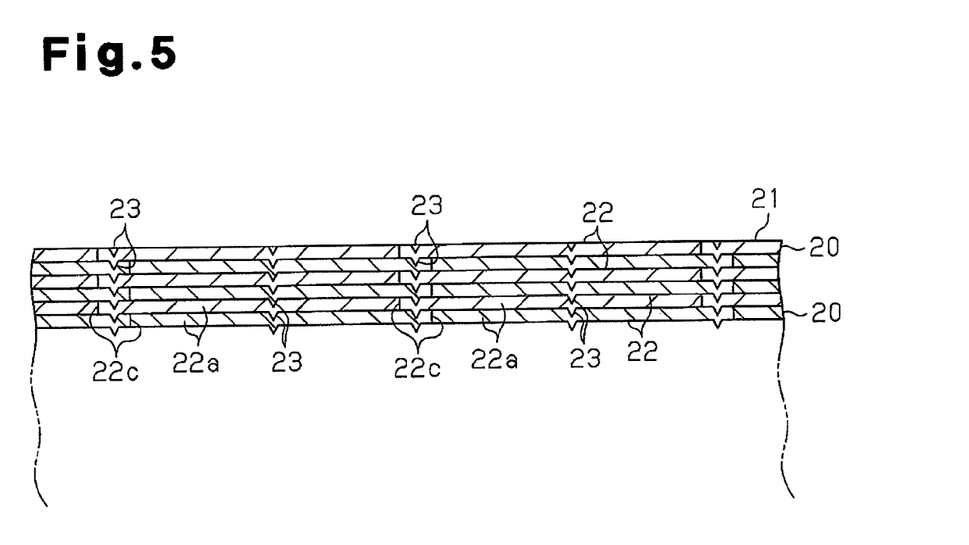
FIG. 5 is a partial cross-sectional view taken along line 5-5 of FIG. 4.

As shown in FIGS. 2, 3 and 5, the core pieces 22 in an odd-numbered layer and the core pieces 22 in an even-numbered layer have the same shapes except the coupling projections 22c. Specifically, the coupling projections 22c extend in opposite directions. The coupling projection 22c of each core piece 22 in each layer is stacked on the coupling projection 22c of the adjacent core piece 22 in the laminating direction. The yoke portions 22a of the core pieces 22 in each layer are stacked on the yoke portions 22a of the core pieces 22 in the adjacent layer the laminating direction. The tooth portions 22b of each core piece 22 in each layer match with the yoke portion 22a of the adjacent core piece 22 in the laminating direction.

Figure 4:
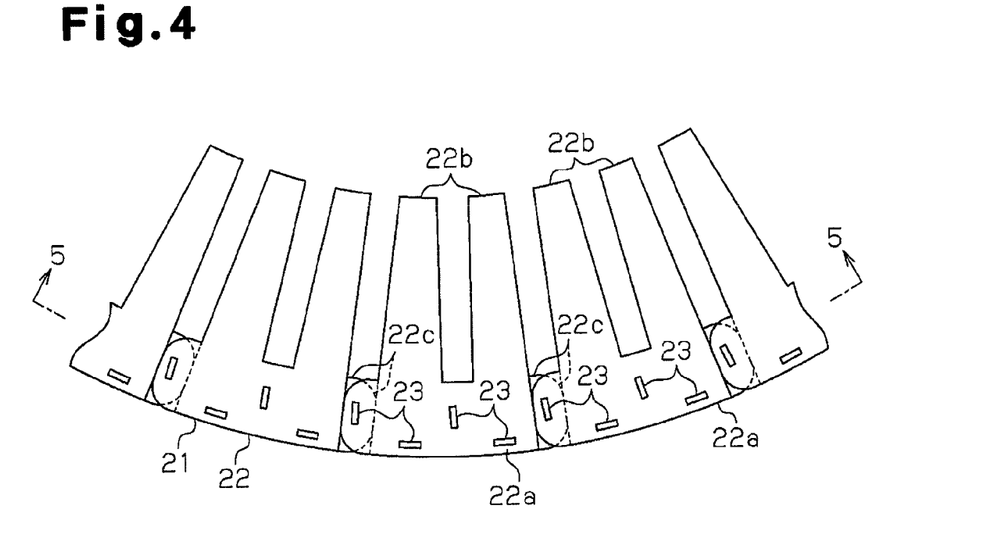
FIG. 4 is a partial plan view of the stator core.

As shown in FIGS. 4 and 5, coupling dimples 23 are formed on the yoke portions 22a and the coupling projections 22c of each core piece 22. Core pieces 22 that are adjacent to each other in the laminating direction are coupled to each other by engaging the coupling dimples 23 with each other. The core pieces 22 are coupled together by being annularly arranged and laminated.

As shown in FIGS. 1 to 3, a band 24 is wound about the outer circumferential surface of the stator core 21. The band 24 has a belt-like shape and is made by a thin iron plate. Attachment portions 25 are located on the outer circumferential surface of the band 24. The attachment portions 25 are separated by predetermined intervals. The stator core 21 is attached to the body of a vehicle via the attachment portions 25.

A manufacturing apparatus for manufacturing the stator core 21 will now be described.

Figure 6:
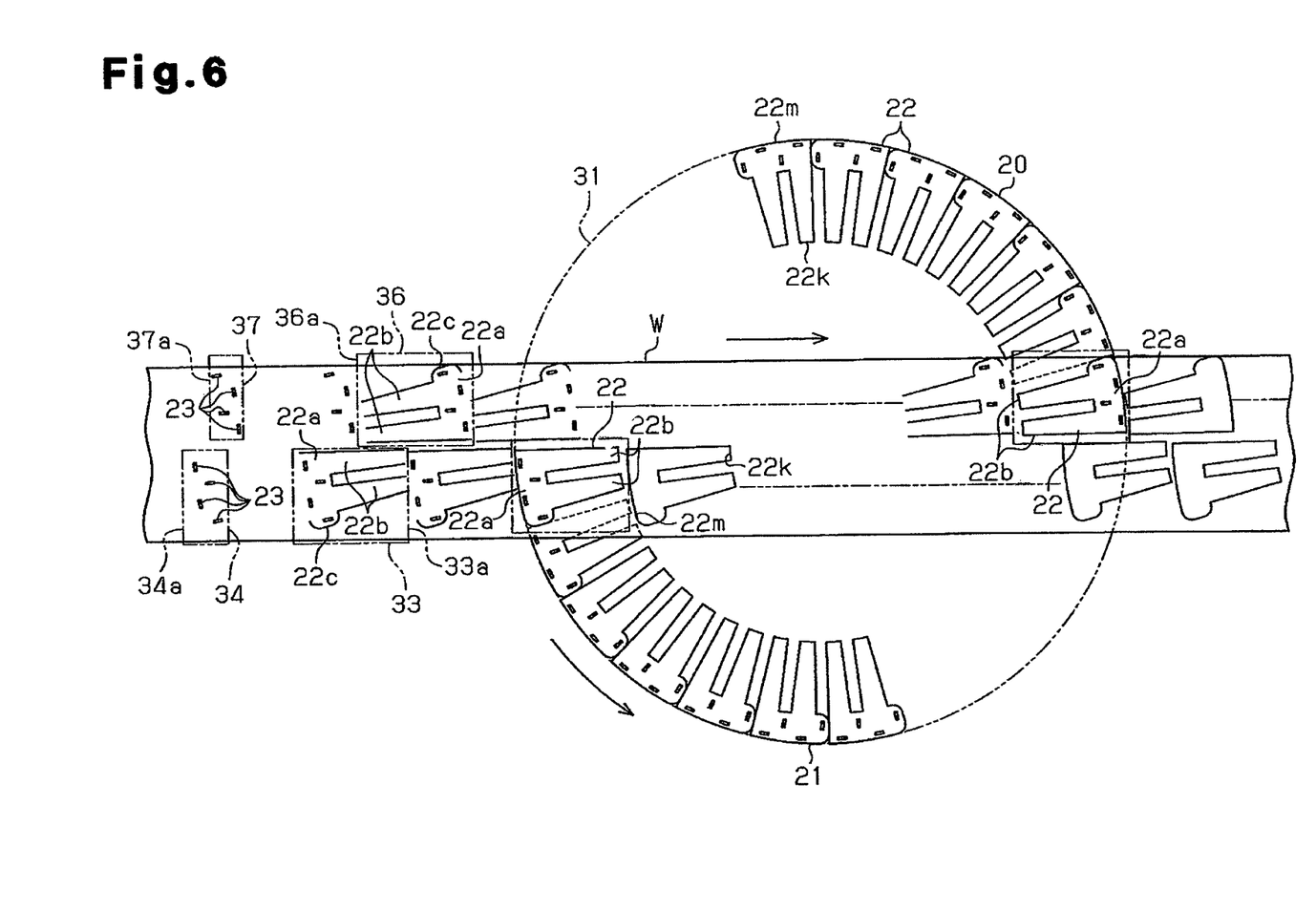
FIG. 6 is a plan view showing a processing step for assembling a core plate.
Figure 7:
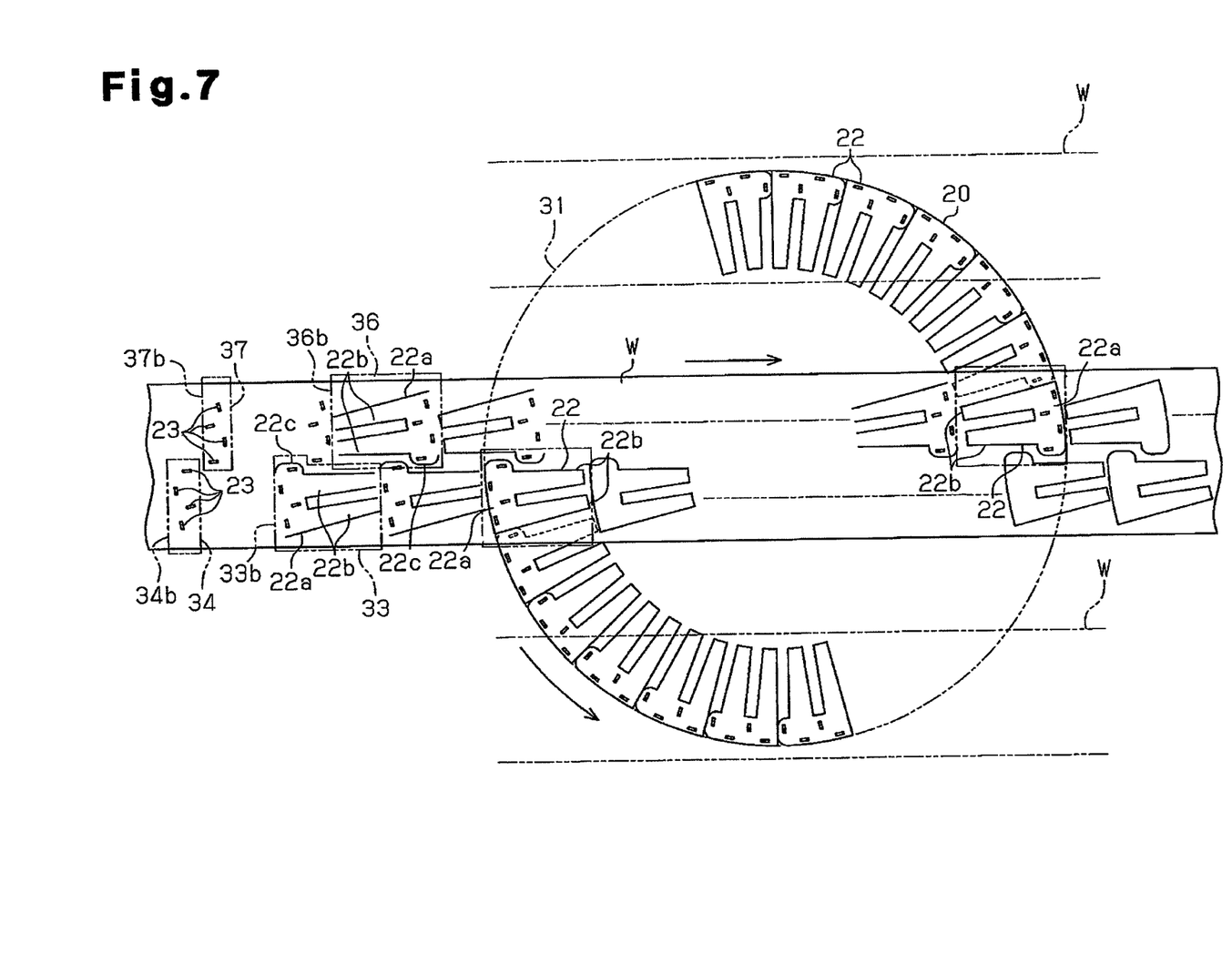
FIG. 7 is a plan view showing a processing step for assembling a core plate in a layer different from that shown in FIG. 6.

As shown in FIGS. 6 and 7, in the manufacturing apparatus, a belt-like workpiece W is conveyed intermittently in the longitudinal direction of the workpiece W. While the workpiece W is in the stopped state, core pieces 22 are punched out of the workpiece W and laminated, as described above. The core pieces 22 are punched out of the workpiece W on both sides of the center line C1 in the width direction (refer to FIG. 11).

Two first auxiliary pressing devices 34, 37 are arranged on the path of the workpiece W. The first auxiliary pressing devices 34, 37 form the coupling dimples 23 on both sides of the center line C1 of the workpiece W. On the path of the workpiece W, a second auxiliary pressing device 33 is provided downstream of the first auxiliary pressing device 34, and a second auxiliary pressing device 36 is provided downstream of the first auxiliary pressing device 37.

Figure 11:
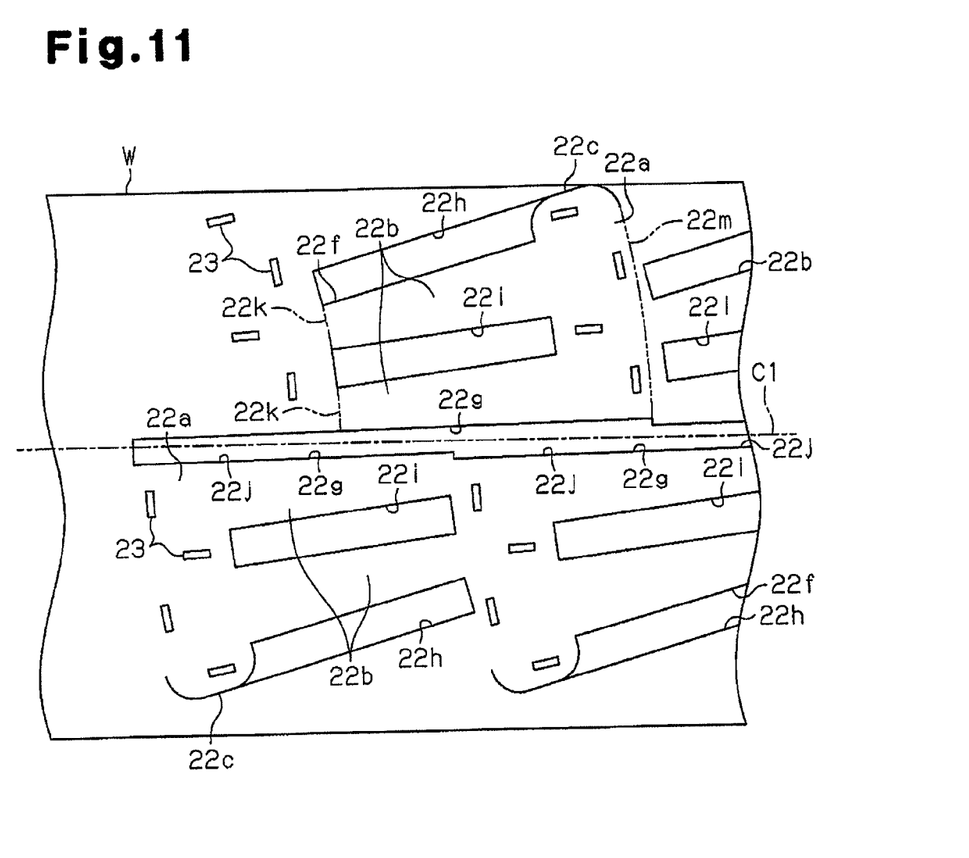
FIG. 11 is an explanatory partial plan view showing a processing step in which side edges of core pieces are punched out.

As shown in FIG. 11, the work piece W is punched out by the second auxiliary pressing device 33, 36 so that through holes 22h, 22i, 22j are formed. Accordingly, side edges 22f, 22g of the core pieces 22 and the space between the tooth portions 22b are formed on both sides of the center line C1 of the workpiece W. As shown in FIGS. 6 and 7, the first auxiliary pressing devices 34, 37 have pressing portions 34a, 34b and 37a, 37b, respectively. The second auxiliary pressing devices 33, 36 have pressing portions 33a, 33b and 36a, 36b, respectively. The pressing portions 34a, 37a, 34b, 37b, 33a, 36a, 33b, 36b are moved in the width direction of the workpiece W to be interchanged. Accordingly, the coupling dimples 23 and the through holes 22h, 22i, 22j of the core pieces 22 in the odd-numbered layers and the core pieces 22 in the even-numbered layers are punched out at slightly displaced positions in the longitudinal direction of the workpiece W. Also, the coupling dimples 23 and the through holes 22h, 22i, 22j of the core pieces 22 in the odd-numbered layers and the core pieces 22 in the even-numbered layers are punched in opposite orientations on both sides of the center line C1.

Figure 8:
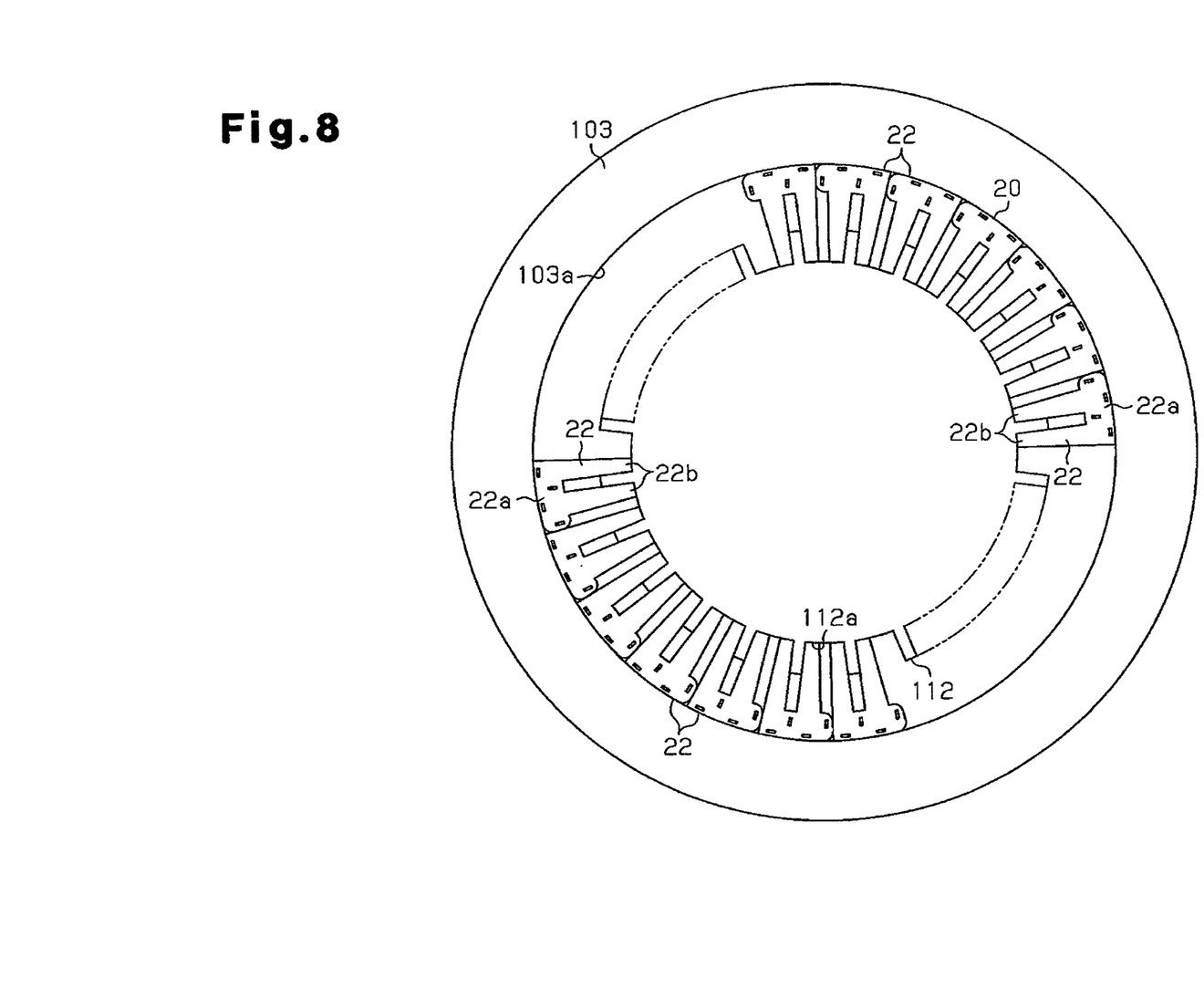
FIG. 8 is a plan view showing the relationship of a core plate with outer and inner dies.
Figure 9:
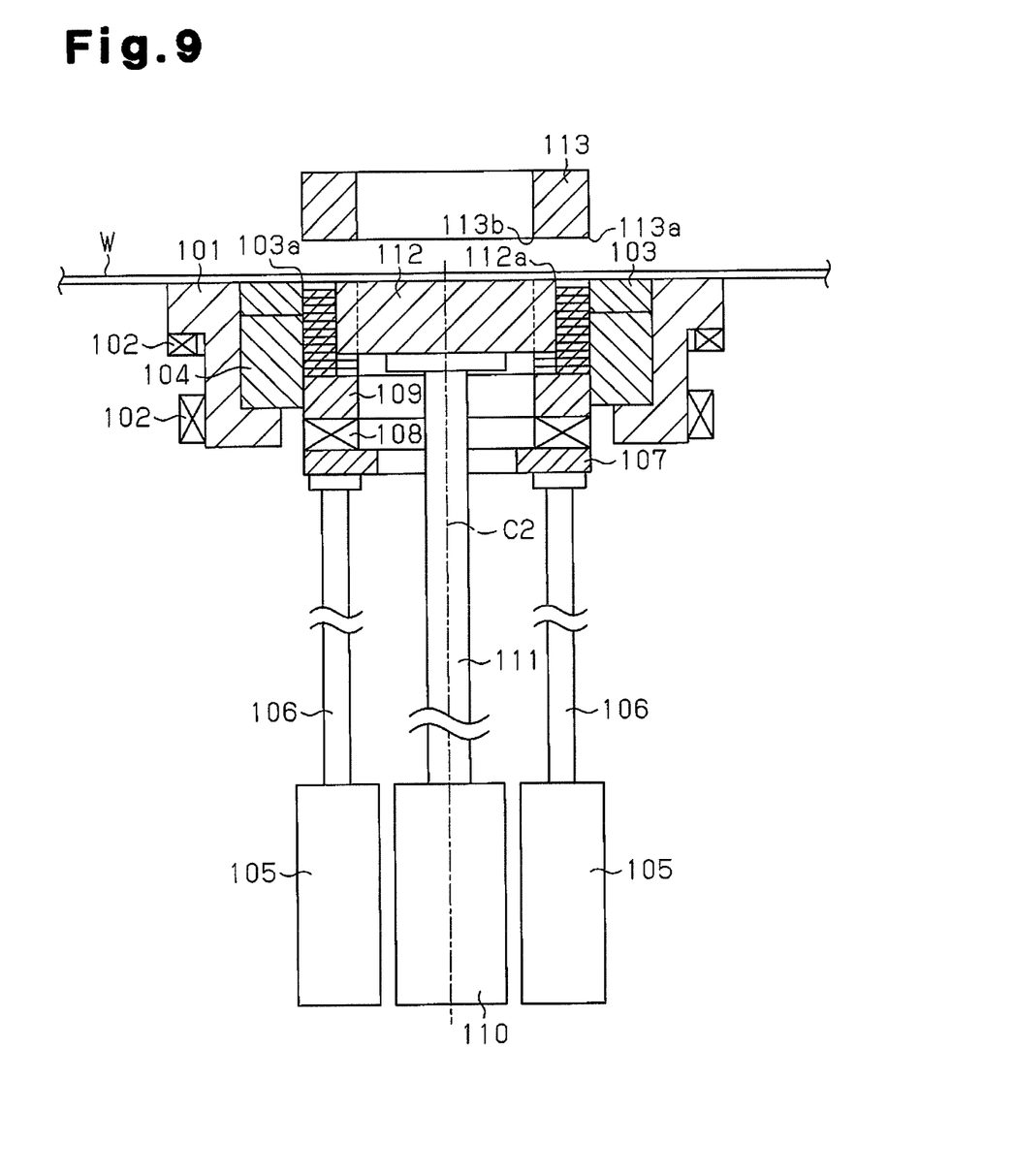
FIG. 9 is a cross-sectional view showing an apparatus for manufacturing a stator core.
Figure 10:
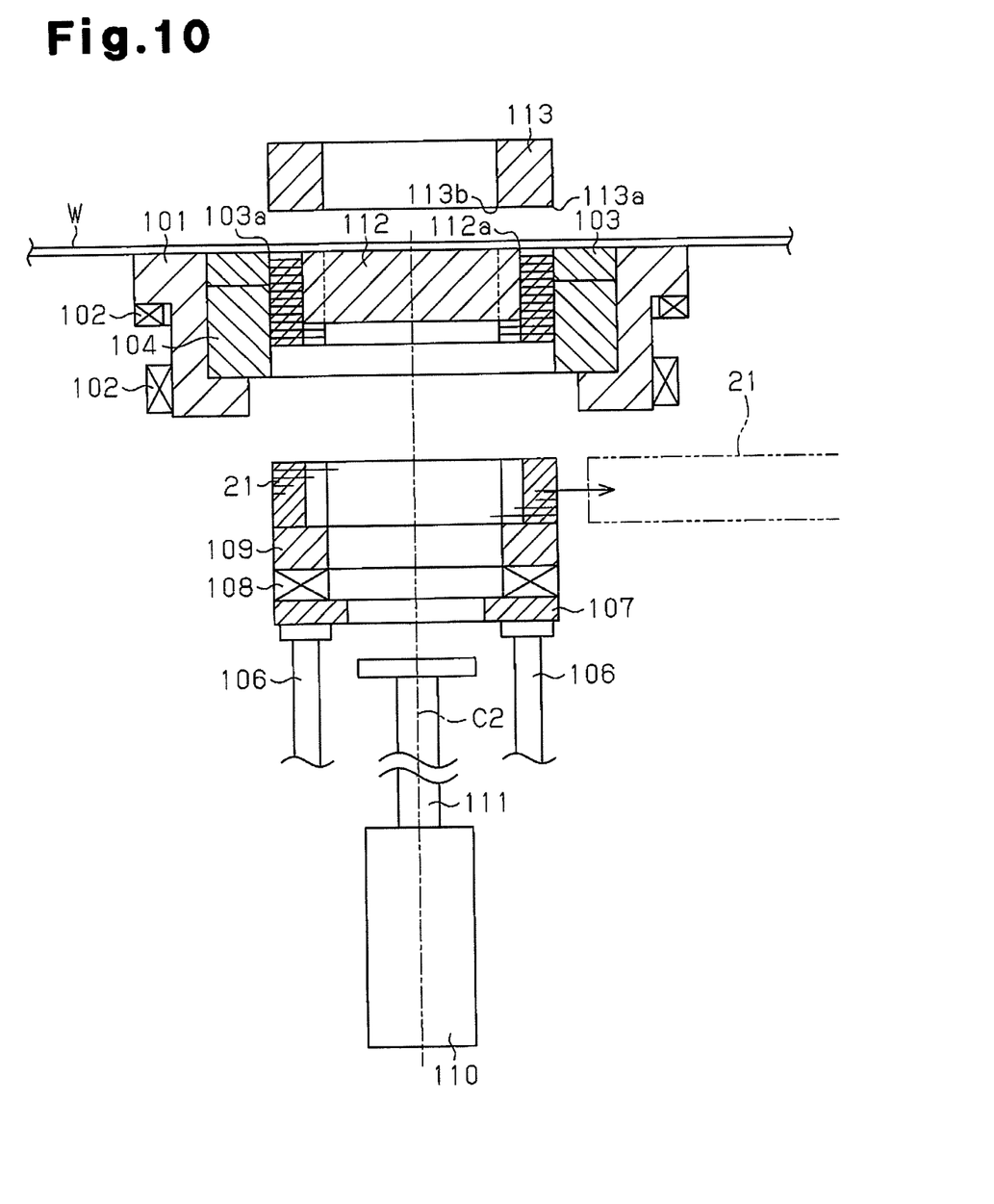
FIG. 10 is a cross-sectional view showing the stator core manufacturing apparatus when discharging a core.

A main pressing device 31 is located downstream of the second auxiliary pressing devices 33, 36. As shown in FIGS. 8 to 10, a retainer ring 101 is located on the frame (not shown) of the main pressing device 31. The retainer ring 101 is rotational about an axis C2 via a radial bearing 102. The retainer ring 101 is rotated by a motor (not shown) by a pitch corresponding to one core piece 22 at a time. A cylindrical outer die 103 and a pressure applying ring 104 are fixed to the inner circumferential surface of the retainer ring 101, while being stacked vertically.

Below the outer die 103 and the pressure applying ring 104, first hydraulic cylinders 105, each of which includes a piston rod 106, are provided. A base 107 is fixed to the distal ends of the piston rods 106. An annular support 109 is rotationally supported on the base 107 via a thrust bearing 108. Thus, as the first hydraulic cylinders 105 are operated, the support 109 is lifted or lowered together with the base 107 and thrust bearing 108.

A second hydraulic cylinder 110 is located below the support 109 to be coaxial with the axis C2. An inner die 112 is placed on the distal end of a piston rod 111. An annular punch 113 is located above the support 109 to be movable vertically. An outer blade edge 113a of the punch 113 corresponds to a blade edge 103a of the outer die 103. An inner blade edge 113b of the punch 113 corresponds to a blade edge 112a of the inner die 112.

As shown in FIGS. 6 and 7, a first core piece 22 formed on one side in the width direction of the workpiece W is located between the outer die 103 and the inner die 112. At this time, a second core piece 22 formed on the other side in the width direction of the workpiece W is located between the outer die 103 and the inner die 112, at a position rotated by 180 degrees from the position of the first core piece 22. The punch 113 is lowered in this state. Each time the punch 113 is lowered, the blade edge 113a and the blade edge 103a of the outer die 103, and the blade edge 113b and the blade edge 112a of the inner die 112 cut remaining edge portions 22k, 22m, so that the core piece 22 is punched out of the workpiece W.

A method for manufacturing the stator core 21 using the above described manufacturing apparatus will now be described.

As indicated by arrows in FIGS. 6 and 7, the workpiece W is intermittently conveyed in the longitudinal direction of the workpiece W by a workpiece feeding device, while the center line C1 thereof is matched with the axis C2 of the manufacturing apparatus. When punching out the core pieces 22 in an odd-numbered layer, such as a first layer, a third layer, and a fifth layer in the stator core 21, the pressing portions 34a, 37a, 34b, 37b, 33a, 36a, 33b, 36b of the first and second auxiliary pressing devices 34, 37, 33, 36 are switched to the positions indicated in FIG. 6. In this state, while the workpiece W is in the stopped state, the first and second auxiliary pressing devices 34, 37, 33, 36 form coupling dimples 23 on both sides of the workpiece W and punch the workpiece W to form through holes 22h, 22i, and 22j.

The positions on the workpiece W at which the first and second core pieces 22 are formed are at two positions on the main pressing device 31 that are separated by 180 degrees, the workpiece W is stopped. While the workpiece W is in the stopped state, the punch 113 is lowered. The punch 113, the outer die 103, and the inner die 112 cut the remaining edge portions 22k, 22m of the core pieces 22, so that two core pieces 22 are simultaneously punched out of the workpiece W. The two punched out core pieces 22 are laminated onto the support 109.

Thereafter, the retainer ring 101, the die 103 and the pressure applying ring 104 are rotated counterclockwise as viewed in FIG. 6 by a pitch corresponding to one core piece 22. At the same time, the workpiece feeding device (not shown) moves the workpiece W by a pitch corresponding to one core piece 22 and then stops moving the workpiece W. Subsequently, the pressing devices 31, 33, 34, 36, 37 are operated in the above described manner, to punch out the core pieces 22 from the workpiece W. The two core pieces 22, which have been punched out by the main pressing device 31, are placed side by side with the core pieces 22 that have been punched out immediately before, and laminated onto the core pieces 22 of the lower layer while being pressed by the main pressing device 31. When the retainer ring 101 is rotated by 180 degrees, a core plate 20 of an odd-numbered layer is formed in an annular shape.

The core pieces 22 of the core plate 20 are held on the inner surface of the outer die 103 due to repulsion of flexing deformation during pressing. Also, the core pieces 22 are held by pressure applied from the outside by the pressure applying ring 104 and pressure applied from the inside by the inner die 112.

When the core pieces 22 of an odd-numbered layer are punched out, the pressing portions of the first and second auxiliary pressing devices 33, 34, 36, 37 are switched to the positions shown in FIG. 7 to punch the core pieces 22 in an even-numbered layer, such as second, fourth, and sixth layers. In this state, as in the case of the core pieces 22 forming an odd-numbered core plate 20, punching of core pieces 22 by the pressing devices 31, 33, 34, 36, 37, rotation of the retainer ring 101, and conveying of the workpiece W are executed. As a result, core pieces 22 of an even-numbered layer are simultaneously punched out at two positions that are separated by 180 degrees in the main pressing device 31. The coupling projections 22c of the punched out core pieces 22 are oriented in the direction opposite to the coupling projections 22c of the core pieces 22 in an odd-numbered layer. The core plate 20 of the even-numbered layer is laminated onto the core plate 20 of the odd-numbered layer. At this time, core pieces 22 that are adjacent to each other in the laminating direction are coupled to each other by engaging the coupling dimples 23 with each other. Core pieces 22 that are adjacent to each other in the laminating direction are held and pressed by the outer die 103 and the pressure applying ring 104. In this manner, core pieces 22 that are adjacent to each other in the laminating direction are brought into close contact without clearance.

Punching and lamination of the core pieces 22 in an odd-numbered layer and punching and lamination of the core pieces 22 in an even-numbered layer are repeated. When punching out the core pieces 22 of the core plates 20 of a predetermined number of layers, a pressing device (not shown) form through holes the size of which is the same as the coupling dimples 23 at positions of the coupling dimples 23 of the workpiece W on the upstream side of the first auxiliary pressing devices 34, 37. When coupling dimples are fitted in the through holes, core plates 20 adjacent to each other in the laminating direction are not coupled to each other. A predetermined number of core plates 20 are laminated to form a core 21.

The core plate 20 that includes the non-coupled portion is discharged downward through the space between the pressure applying ring 104 and the inner die 112. Then, as shown in FIG. 10, the operation of the first hydraulic cylinders 105, 110 lowers the support 109 together with the base 107 and thrust bearing 108. The core 21 on the support 109 is then conveyed to the next processing step. At this time, the inner die 112 is held by the outer die 103 and the core pieces 22 in the pressure applying ring 104. The inner die 112 is thus held at a predetermined position without being lowered.

When the process is started, no core pieces 22 are placed on the support 109. Punched out core pieces 22 are held by the outer die 103 and the pressure applying ring 104. Therefore, a space exists above the support 109 (below the punched out core pieces 22) until a predetermined number of core pieces 22 are punched out and the core pieces 22 reach the support 109. Thus, when starting the process, a dummy core (not shown) is placed on the support 109 to support punched out core pieces 22 from below and to stabilize punching of core pieces 22. The dummy core is conveyed as in the case of the cores 21.

After the cores 21 are conveyed, the hydraulic cylinders 105, 110 are operated to return the support 109 to the position shown in FIG. 9, together with the base 107 and the thrust bearing 108. Punching and lamination of core pieces 22 are then resumed.

The first embodiment has the following advantages.

(1) The workpiece W is conveyed intermittently. While the workpiece W is in the stopped state, the side edges 22f, 22g of a core piece 22 are punched out, and another core piece 22 is cut off at the remaining edges 22k 22m at a downstream position in the moving direction of the workpiece W. The core pieces 22 punched out of the workpiece W are aligned and laminated on the support 109. In this manner, the main pressing device 31 only needs to punch out the remaining edges 22k, 22m of the core pieces 22. Therefore, a die that has a shape corresponding to the entire shape of the core piece 22 is not required. Thus, unlike the prior art, the punched out core pieces 22 do not need to be pushed back. This eliminates the necessity for a device for the push-back operation, and simplifies the configuration of the manufacturing facility.

(2) Unlike the prior art, punched out core pieces 22 are not pushed back. Thus, the outer edges of the core pieces 22 are prevented from being damaged. Post-processing is therefore not required, which simplifies the production process. Also, the magnetic characteristics of the core 21 are not degraded, so that high-performance cores 21 are obtained.

(3) A single workpiece W is conveyed intermittently along its length, and two core pieces 22 are simultaneously punched out of the workpiece W. This reduces the cycle time of the production process.

(4) In accordance with the manufacturing method, core pieces 22 are simultaneously punched out at two positions that are separated by 180 degrees in the main pressing device 31. Therefore, the annular core plate 20 can be formed by moving the outer die 103 and the inner die 112 half turn. This reduces the cycle time of the production process.

Second Embodiment

A second embodiment of the present invention will now be described with reference to FIGS. 12A and 12B. Like or the same reference numerals are given to those components that are like or the same as the corresponding components of the first embodiment.

Figure 12A:
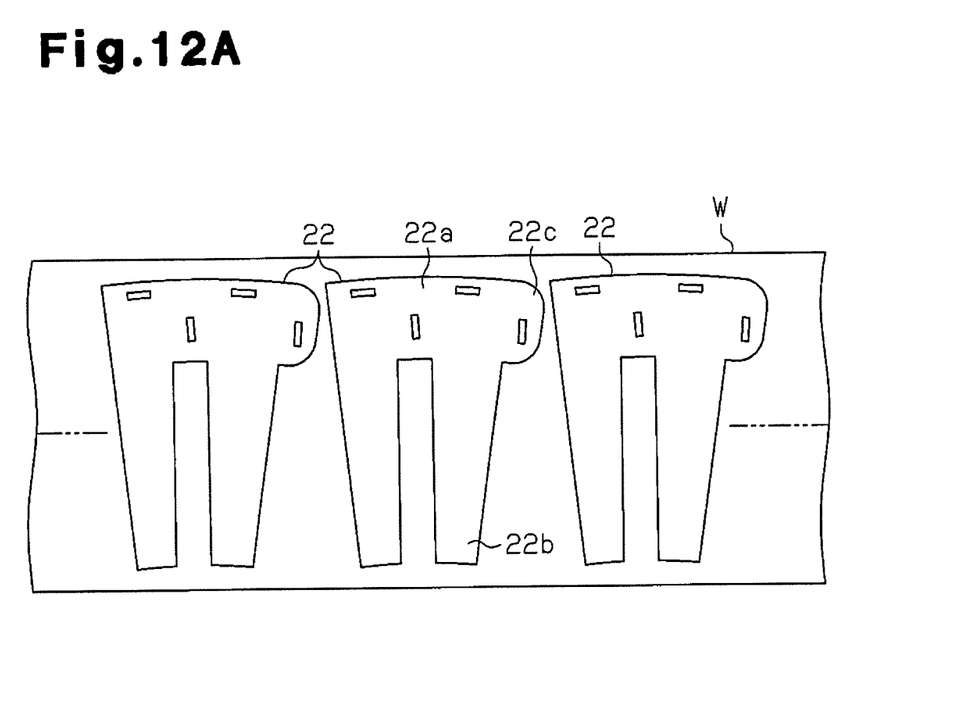
FIG. 12A is a partial plan view illustrating a manufacturing method according to a second embodiment of the present invention.
Figure 12B:
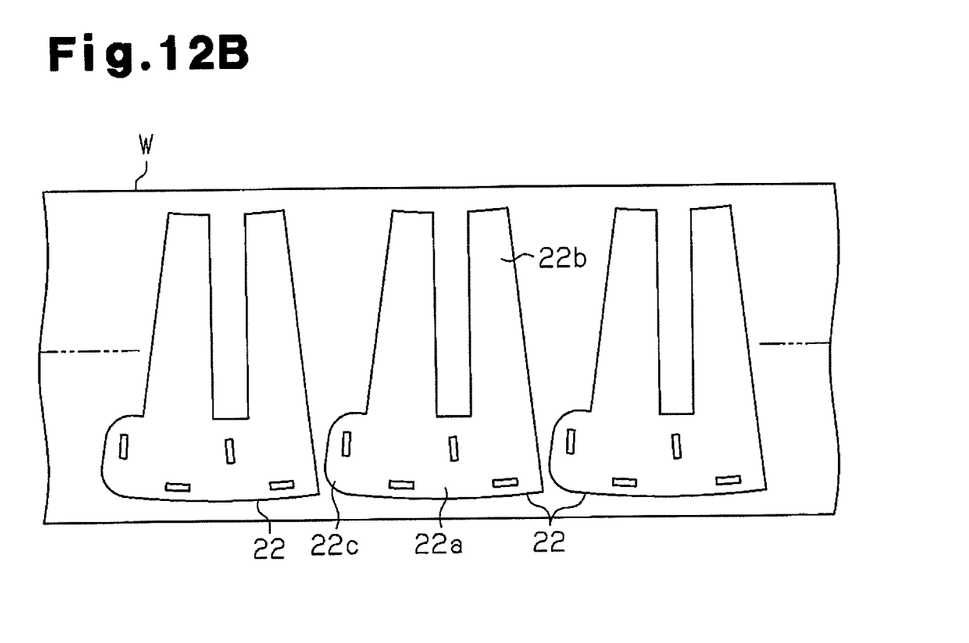
FIG. 12B is a partial plan view illustrating the manufacturing method according to the second embodiment of the present invention.

As shown in FIGS. 12A and 12B, two belt-like workpieces W are used. Core pieces 22 are punched out one by one from each workpiece W, with the tooth portions 22b oriented in the width direction of the workpiece W. As indicated by lines formed by a long dash alternating with two short dashes in FIG. 7, the workpieces W are conveyed at two opposite positions that correspond to the outer periphery of the main pressing device 31. Core pieces 22 are simultaneously punched out at two positions that are separated by 180 degrees in the main pressing device 31.

Thus, the second embodiment achieves the same advantages as the advantages of the items (1) to (4) of the first embodiment.

Third Embodiment

Hereinafter, a third embodiment of the present invention will be described with reference to FIG. 13. In the third embodiment, like or the same reference numerals are given to those components that are like or the same as the corresponding components of the first embodiment.

Figure 13:
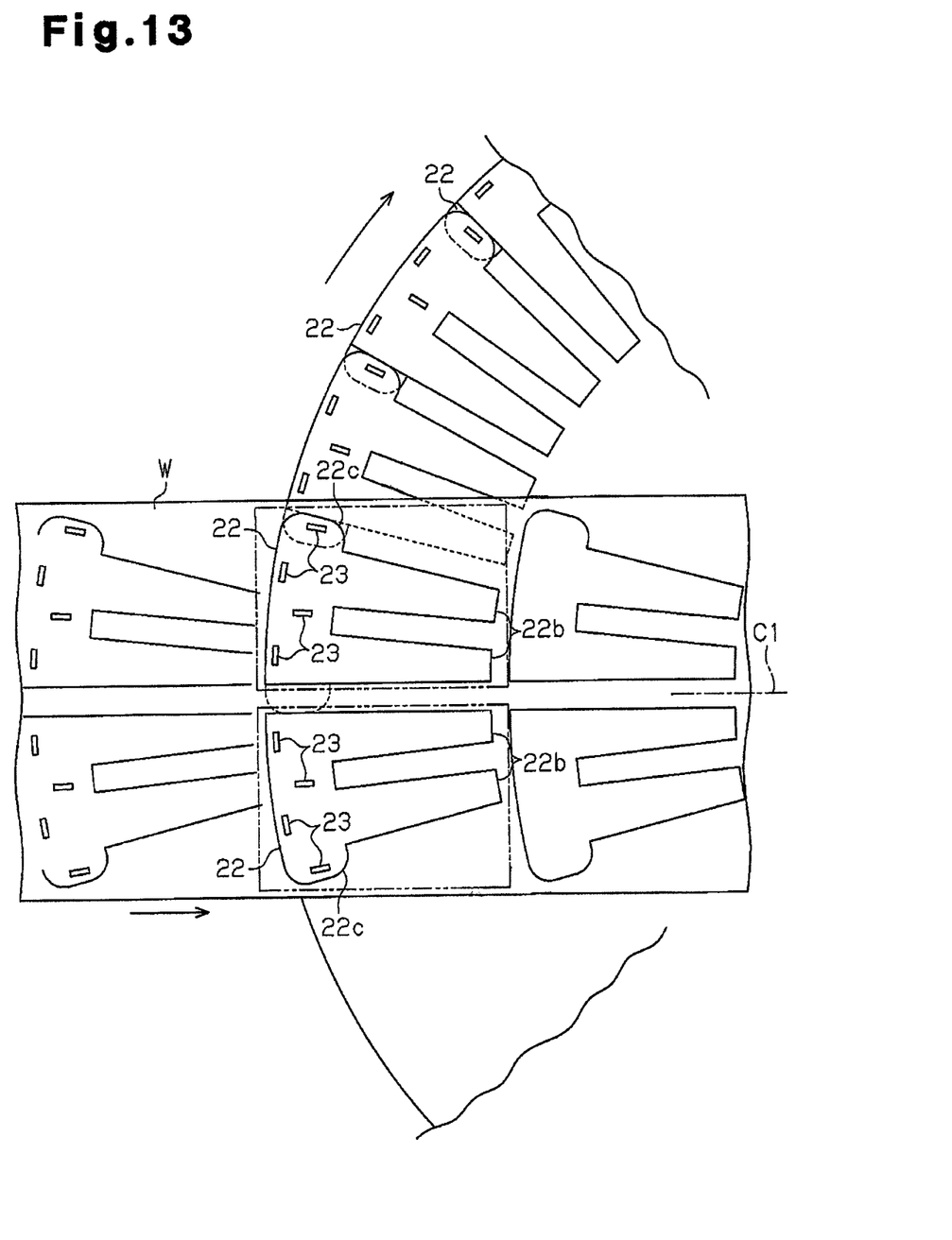
FIG. 13 is a partial plan view illustrating a manufacturing method according to a third embodiment of the present invention.

As shown in FIG. 13, core pieces 22 are punched out of a belt-like workpiece W on both sides of the center line C1. At this time, core pieces 22 are punched out while being oriented in the same direction. When laminating core pieces 22, a core piece 22 is punched out at a trailing position in the rotation direction of the retainer ring 101. The core plate 20 of the first layer is formed by the core pieces 22. Next, two core pieces 22 are simultaneously punched out of the workpiece W and laminated onto core pieces 22 of the lower layer. In this manner, a core plate 20 of an odd-numbered layer (lower layer) is formed by the core pieces 22 on the trailing side, and a core plate 20 of an even-numbered layer (upper layer) is formed by the core pieces 22 on the leading side.

The third embodiment thus achieves the same advantages as the first embodiment.

The above embodiments may be modified as follows.

The core pieces 22 may be punched out in a shape different from that described in the above embodiments. For example, the core pieces 22 may each be punched out to have a single tooth portion 22b.

The present invention may be applied to a method for manufacturing a rotor core of a motor.

Core pieces 22 may be arranged in a straight line to form straight core plates 20, and such core plates 20 may be laminated. In this case, a straight support is used for supporting the core pieces 22. The support is moved by a pitch corresponding to one core piece at a time along the length of the support, and is caused to reciprocate by a stroke that corresponds to the length of the core plate 20. The core in this case is suitable for a linear motor.

A pressing device for punching the distal ends of the tooth portions 22b of the core pieces 22, that is, the inner edges of the core pieces 22, may be provided at a position upstream of the main pressing device 31. In this case, the inner die 112 of the main pressing device is unnecessary.

Punched out core pieces 22 may be held aligned by the pressure applied by the pressure applying ring 104. In this case, a core that is discharged from below the pressure applying ring 104 is pressed strongly in the laminating direction of the core pieces in the next processing step. This causes the core pieces to closely contact each other.

The invention claimed is:

1. A method for manufacturing a core of a rotating electrical machine, wherein the core is formed by laminating core plates made of a plurality of core pieces, the method comprising:

intermittently conveying a workpiece along a length of the workpiece;

punching out side edges of a core piece while the workpiece is in a stopped state and, at a downstream position in a conveying direction of the workpiece, cutting remaining edges of the core piece to punch out the core piece, for each of the core pieces;

forming on each of the core pieces a yoke portion having a pair of sides and a tooth portion;

forming a projection on one of the sides of the yoke portion;

laminating the projection of one of the core pieces onto the projection of another of the core pieces that is adjacent in the laminating direction; and laminating the core pieces while lining up the punched out core pieces in a circumferential direction of a core plate to form the core plate.

2. The method for manufacturing a core of a rotating electrical machine according to claim 1, further comprising lining up the punched out core pieces on a support, which is moved by a pitch corresponding to one core piece at a time.

3. The method for manufacturing a core of a rotating electrical machine according to claim 1, further comprising lining up the punched out core pieces on a support, which is rotated by a pitch corresponding to one core piece at a time, into an annular shape having a center coinciding with a rotational axis of the support.

4. The method for manufacturing a core of a rotating electrical machine according to claim 1, further comprising, prior to punching out the side edges of the core piece, forming dimples for coupling the laminated core pieces to each other.

5. The method for manufacturing a core of a rotating electrical machine according to claim 3, further comprising simultaneously laminating the core pieces at two positions on the support that are separated by 180 degrees.

6. The method for manufacturing a core of a rotating electrical machine according to claim 5, further comprising punching out two of the core pieces at a time at the same positions in the width direction of the workpiece.

* * * * *